Patented Oct. 23, 1923.

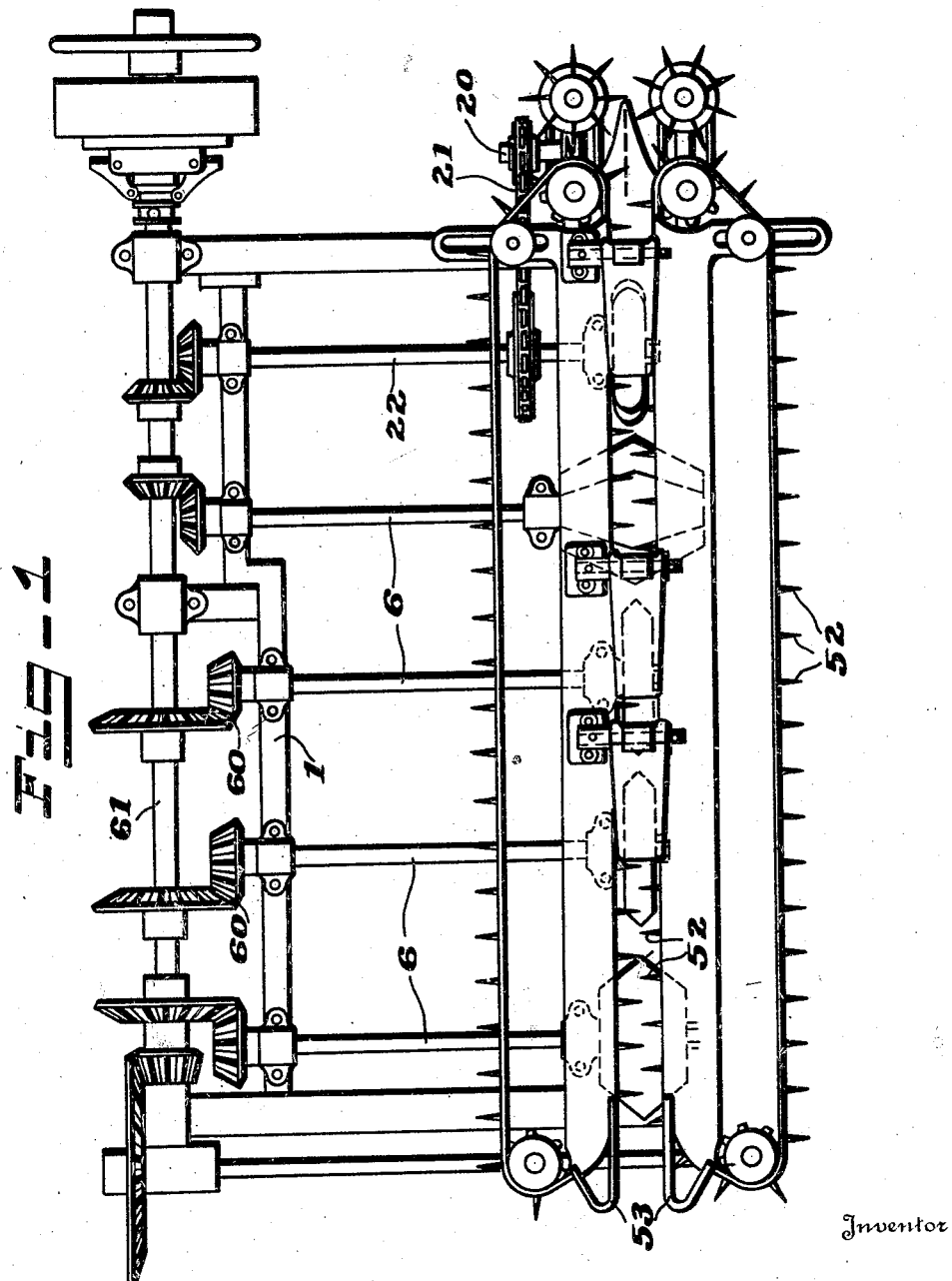

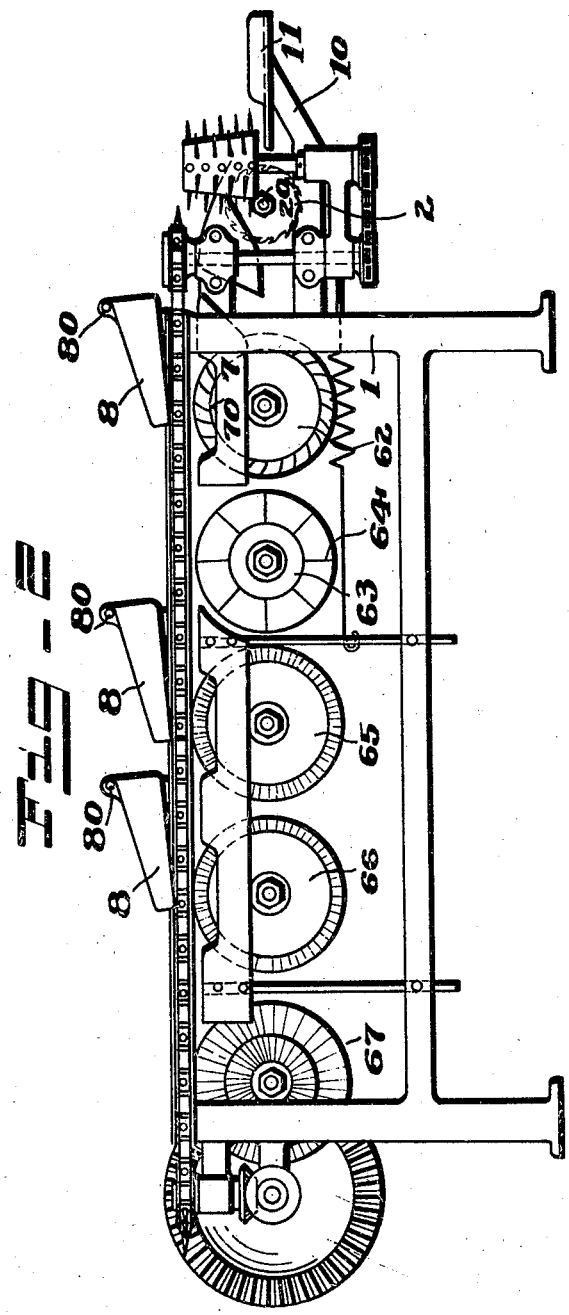

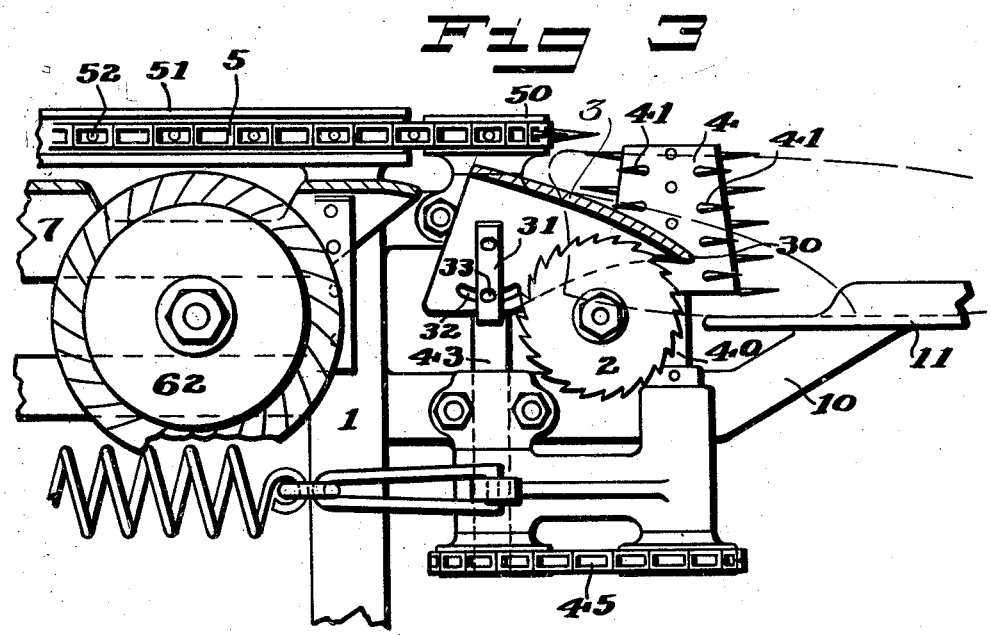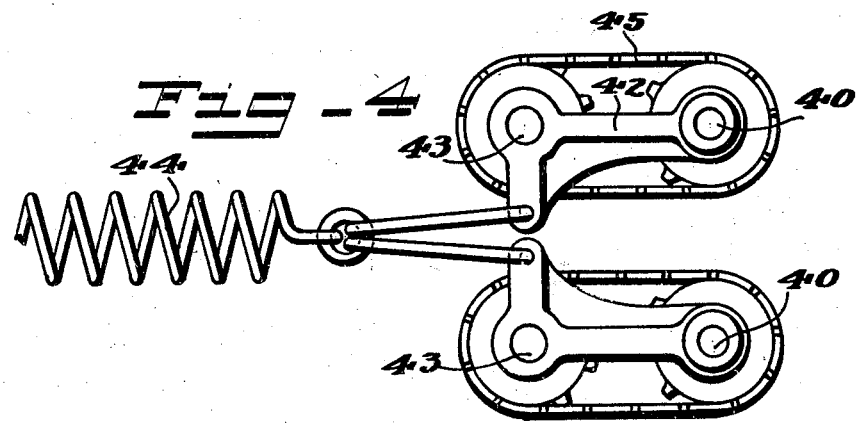

1,471,567

UNITED STATES PATENT OFFICE.

NIELS C. NICHOLSON, OF SEATTLE, WASHINGTON, ASSIGNOR TO SEATTLE-ASTORIA IRON WORKS, OF SEATTLE, WASHINGTON, A CORPORATION OF WASHINGTON.

FISH-DRESSING MACHINE.

Application filed March 6, 1923. Serial No. 623,104.

*To all whom it may concern:*

Be it known that I, NIELS C. NICHOLSON, a citizen of the United States of America, and a resident of the city of Seattle, in the county of King and State of Washington, have invented certain new and useful Improvements in Fish-Dressing Machines, of which the following is a specification.

My invention relates to fish dressing or cleaning machines.

The object of my invention is to provide a machine of such type of construction and provide with such means that the slitting of the fish and the subsequent cleaning thereof shall be done more perfectly than with machines commonly used for this purpose, and to provide a machine of this character which will be simple and cheap in construction and easily taken care of and operated.

The present machine is a development from and improvement upon the machine shown in Patent No. 1,217,809, issued to me February 27, 1917.

The features of my invention which I believe to be new will be hereinafter described and then particularly pointed out as the claims.

The accompanying drawings show my invention in its present preferred form.

Figure 1 shows a plan view of the machine.

Figure 2 is a side elevation of the machine.

Figure 3 is a section taken in a vertical longitudinal plane of the machine on the plane which contains the slitting saw, and illustrating the mechanism which is adjacent to the slitting saw.

Figure 4 shows in plan the arrangement of the mechanism for feeding the fish to the slitting saw and to the main carrier.

It has been found in practice that the chief defect of the machines which were formerly in use in cleaning fish, has been in the thorough and reliable cleaning of the fish after the fish has been slit. One reason for this is that the machines more generally employed for this purpose do not perfectly slit the fish along the central line of the belly and experience has shown that when a fish is not slit exactly along the central line, the brushing and cleaning means which later are applied to the cleaning of the visceral cavity will not work to clean this cavity of all offal and objectionable matter. For instance, if the cut is a little to one side of the central line, the edge of the fish at the side which contains the surplus, or that part which should have been attached to the opposite side, has a slightly recurved edge which prevents the brushing and scraping mechanism from thoroughly acting thereon. One of the objects desired in the present machine is to secure an accurate central splitting of the fish in all cases.

It has been found that if the fish be passed through the machine head end first and with the belly or slit side down, the entrails and offal which are removed from the fish will be more conveniently disposed of than where the opposite position, namely with the belly side up, is employed as was done in the patent above referred to. Furthermore if the fish be guided in position by a mechanism which positions it and presents it to the main carrier by engagement with the surface at the top or backbone side of the visceral cavity, it will position the fish more accurately for action thereon of the later brushing and cleaning mechanisms than may be secured in any other way. The surface of the cavity which is to be cleaned thus acts as the means for positioning the fish at exactly the right level. Consequently it is possible to mount all of the cleaning mechanisms which act thereon after slitting, in fixed position and at the same time secure accurate and correct relation thereof with the inner surface of the fish which is to be cleaned. This method of pressing and handling the fish, therefore, permits of a simple and cheap construction of the other parts of the machine.

In the drawings, 1 represents a frame upon which the operating parts of the machine are mounted. This may be of any suitable type of construction. At the end at which the fish are received for passing through the machine, is located a slitting saw 2. This saw is mounted to turn upon a horizontal shaft which extends transversely of the machine. This shaft 20 is driven in any suitable manner. The means illustrated consist of a chain 21 which passes over the sprocket wheels carried by the shaft 20 and a jack shaft 22. For proper presentation of the fish to a slitter saw a suitable support should be provided. This is indicated as a plate or shallow trough 11 which is supported by an arm 10 from the frame of the machine. This may be provided with means for adjusting its height.

Associated with the slitter saw 2 is a plow or saddle 3. This somewhat resembles in its shape that of a double moldboard plow in an inverted position. The forward end 30 of this plow, or that which first engages the fish, is small. The central ridge of the plow inclines upward and backward or in the direction of movement of the fish through the machine. The flanks of this extend outwardly and also downwardly. This device is placed with its convex or ridge side upward and astride of the saw. The point 30 is positioned so as to engage the fish a little in advance of the saw. This is mounted upon arms 31 or suitable supports which are connected with the frame. For convenience in adjusting the angular position of this device it may be provided with slots 32 in its sides through which pass the securing bolts 33. Any other suitable means for adjusting this, both in elevation and in angular position, may be adopted.

Fish to be treated by this machine are presented thereto after having been beheaded. In operating upon such fish as salmon, I prefer to first pass them through a machine which is in common use, by which they are be-headed and the fins and tails removed. In this condition the fish are presented to the slitter saw of this machine with the back upward. They are first engaged with the auxiliary or preliminary feeding means which as herein shown consists of two revolving drums as 4. These are mounted to turn upon vertical shafts 40 and are provided with projecting spikes 41 or any other suitable type of construction by which the fish may be engaged and positively fed forward.

To accommodate these drums to properly act upon fish of considerable difference in size, I prefer that they be mounted so as to have a symmetric movement towards and from the center, that is, a movement in which they each move alike and are maintained at the same distance from the center line, whereby the fish are held symmetric with the central plane in which the slitter saw 2 turns. This is essential if the fish are to be slit along their exact central plane.

In Figure 4 is shown a mechanism by which this result may be secured. This shows a bell crank lever 42 which is pivoted at 43. One of these is provided for the support of each of the feed drums 4. To the other arm of this bell crank lever is connected a spring as 44 which acts upon the two equally so as to draw the drums towards the central line and yet to permit their being separated by the passage of a fish, if the fish be sufficiently thick to require this.

The shafts 40, carrying the drums, are driven from the pivot shaft 43 as by the use of chains 45 extending over sprocket wheels carried by each of these shafts. The pivot shafts 43 are in turn driven by the chains 5 which form the main carriers for the fish. These chains 5 pass over sprocket wheels 50 carried by the upper ends of the shafts 43.

The chans 5 are essentially the same as the carrier chains illustrated in my patent previously mentioned. Two of these are employed and these have their adjacent runs moving in the same direction and spaced apart, a suitable distance to hold the fish being cleaned in proper position to be acted upon by the cleaning mechanism. This run of each of the chains is confined within a guideway as 51.

The mechanisms which are designed to act upon the fish after it has been slit may be varied in accordance with circumstances. These are, as herein illustrated, all of a rotative character and are mounted upon transversely extending shafts 6. These shafts are journaled in fixed position upon the frame and are turned by bevel gears as 60 from the main drive shaft 61.

The cleaning means illustrated in the present machine consists of a disk or wheel 62 which is provided with blades or paddles upon its outer or peripheral portion. These are designed to give the visceral cavity of the fish a good scraping as it passes thereover. To better support the fish and particularly the flanks thereof, I provide a shoe as 7 which seats astride the wheel 62. This is shaped to conform somewhat to the shape of the slit fish. It is provided with an opening 70 in its central upper portion to permit the action of the wheel upon the fish.

Following next after this is a wheel 63 which is of considerable extent in the direction of its axis and is provided with radially positioned blades 64 by which the flanks of the fish are scraped. This paddle wheel, as it might be called, is not provided with any covering plate. It is of a double conical shape and spreads the sides or flanks of the fish out and gives it a good scraping. Following after this are cleaning devices 65, 66 and 67. These may be in the way of brushes or scraping wheels or a combination of the two. One or the other of the above cleaning devices is preferably provided with a central cutting edge or web of sufficient depth to cut and open up the blood sack which lies along the under side of the backbone of the fish, so as to open this up for thorough cleaning by the brushes which follow. This is a type of construction which is old in the art.

Presser plates as 8 may be employed to engage the back surface of the fish and to hold it down at the time it is being acted upon by the brushing and scrubbing wheels.

These are pivoted as at 80. The chains 5 which support and convey the fish are provided with holding spikes 52 which enter the fish adjacent to its backbone and support and positively feed it through the machine. The fish is relieved from these spikes by the use of disengaging bars 53 which extend to the rear a sufficient distance to include enough of the curve of the chain to insure disengagement of the fish therefrom.

The perfect action of the cleaning mechanisms upon the fish after it has been slit depends to a considerable extent upon the proper and accurate placing of the fish with reference to these cleaning mechanisms. If the fish is held at too high a level that portion of the cavity which lies next to the backbone will not be properly cleaned, and if it be held at too low a level the brushing and scraping action of these mechanisms may be too severe, with a result of mutilating the fish. By employing a device such as the plow 3 to deliver and accurately guide the slit fish to the carrier 5, the exact level of the fish at the time it is engaged by this carrier is determined by the position of the upper ridge of the plow. This ridge engages the fish by the part thereof which is immediately below the backbone, that is by the surface which is to be cleaned. In consequence the position of the fish so as to be held at the exact level which produces best results is accurately and automatically determined. This fact contributes largely to the perfection of working of the machine.

When the fish is presented to the slitter saw the point 30 of the plow enters the beheaded end of the fish. It therefore passes into the abdominal or visceral cavity of the fish slightly in advance of the action of the slitter thereon. This engages the backbone side of this cavity and causes the fish to be raised. The diverging lower edges of the plow adjacent to its point tend to slightly stretch the fish before it is slit and being accurately positioned relative to the plane of the slitter saw, will cause this saw to cut on the exact central line of the fish. This fact also contributes to the perfection of the action of the subsequent cleaning mechanism. It is thus seen that the position of the plow or saddle relative both to the slitter saw and to the subsequent carrying mechanism, namely the chain 5, contributes in two ways to the perfection of action of the machine.

The upper edge or ridge of the plow engaging the upper inner surface of the visceral cavity in the fish and also covering the slitter saw, protects the slitter saw from cutting any part of the fish except the lower abdominal wall, thus leaving intact the membrane within said cavity and the skin rearward of said cavity, so that the flesh is not laid open for disruptive contact with the later acting cleaning parts. If the fish be a litle soft at the time of cleaning, this prevents mutilation and tearing of the flesh, which would be very objectionable.

What I claim as my invention is:

1. In a fish dressing machine, a slitter saw, a plow positioned over the slitter saw with its concave side down and having a point adapted to enter the visceral cavity of a beheaded fish in advance of the slitter, and means for feeding the fish back up to carry it over said plow and slitter.

2. In a fish dressing machine, a slitter saw, a plow fitting as a saddle closely over the slitter saw with its point adapted to enter the visceral cavity of a beheaded fish in advance of the action of the slitter saw, the central ridge of the plow inclining upwardly from the point towards its rear.

3. In a fish dressing machine, a slitter saw, a plow fitting as a saddle closely over the slitter saw with its point adapted to enter the visceral cavity of a beheaded fish in advance of the action of the slitter saw, and means for adjusting the angular position of the plow.

4. In a fish dressing machine, a fish feeding means, a slitter saw, a plow fitting as a saddle closely over the saw with its point adapted to enter the visceral cavity of the fish in advance of its contact with the slitter, the plow having its central ridge inclining upwardly from its point towards its rear, and means for adjusting the angular position of the plow.

5. In a fish dressing machine, a fish feeding means comprising two spaced-apart rotative shafts and an endless belt operated by each, a frame pivoted concentric with each of said shafts, a shaft journaled on the swinging ends of each frame, chains connecting the shafts of each frame, a fish feeding drum upon each of the shafts carried by the swinging ends of said frames, and a slitter and covering plow positioned on the central plane between said drums.

6. In a fish dressing machine, a slitter saw, and a plow mounted as a saddle over the saw with its central point in advance of the slitter and at a level somewhat below the top edge of the saw, the side flanges of the plow diverging rearwardly and being maintained below the top edge of the saw.

7. In a fish dressing machine, a slitter saw, and a plow mounted as a saddle over the saw with its central point in advance of the slitter and at a level somewhat below the top edge of the saw, the side flanges of the plow diverging rearwardly and being maintained below the top edge of the saw, and means for adjusting the angular position of the plow.

8. In a fish dressing machine, a slitter saw, and a plow mounted as a saddle over the saw with its central point in advance of the slitter and at a level somewhat below the top edge of the saw, the side flanges of the plow diverging rearwardly and being maintained below the top edge of the saw, and feeding means for presenting fish to the slitter located in advance of the slitter and at each side of its plane.

9. In a fish dressing machine, a slitter saw, and a plow mounted as a saddle over the saw with its central point in advance of the slitter and at a level somewhat below the top edge of the saw, the side flanges of the plow diverging rearwardly and being maintained below the top edge of the saw, feeding means for presenting fish to the slitter located in advance of the slitter and at each side of its plane, and means for yieldingly holding said fish feeding means towards each other.

10. In a fish dressing machine, a slitter saw, and a plow mounted as a saddle over the saw with its central point in advance of the slitter and at a level somewhat below the top edge of the saw, the side flanges of the plow diverging rearwardly and being maintained below the top edge of the saw, feeding means for presenting fish to the slitter located in advance of the slitter and at each side of its plane, and a common means acting to yieldingly and uniformly hold the said fish feeding means toward the plane of the slitter.

11. A fish cleaning machine comprising a pair of endless chains provided with fish engaging and holding means, guides maintaining adjacent runs of said chains in parallel relationship to serve as a carrier for the fish, a series of cleaning mechanisms located between and beneath said carrier, a slitting saw and a plow at the receiving end of said carrier, said plow fitting as a saddle over the slitting saw, and serving as a guide to present the fish to said carrier at proper level to be effectively acted upon by the following cleaning mechanisms.

12. In a fish cleaning machine, a fish carrier, a series of independent cleaning mechanisms located in fixed position relative to and along the path of said carrier, a slitting saw and a plow fitting as a saddle over the saw and located at the receiving end of said carrier, said plow engaging the backbone side of the visceral cavity of the fish to thereby present it to the carrier in position for effective action of the before-mentioned cleaning mechanisms.

Signed at Seattle, King County, Washington, this day of 13th February, 1923.

NIELS C. NICHOLSON.